H. S. GREENE.
PLANETARY NAPPING MACHINE DRUM.
APPLICATION FILED FEB. 14, 1912.
1,030,657.
Patented June 25, 1912.
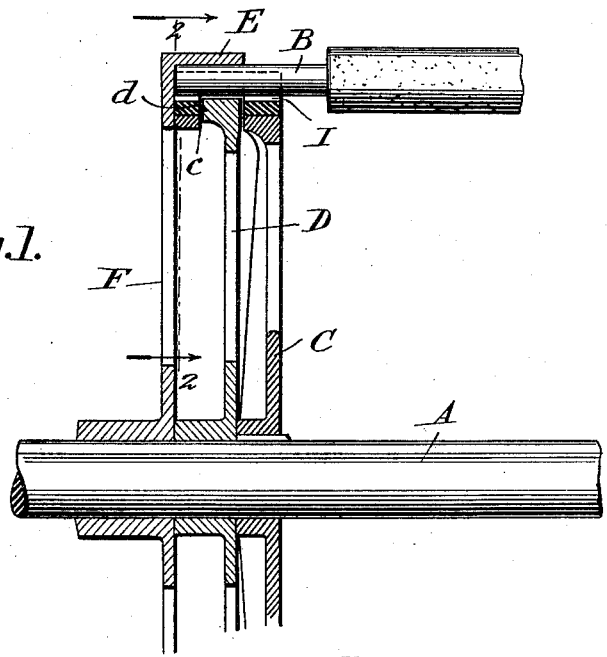
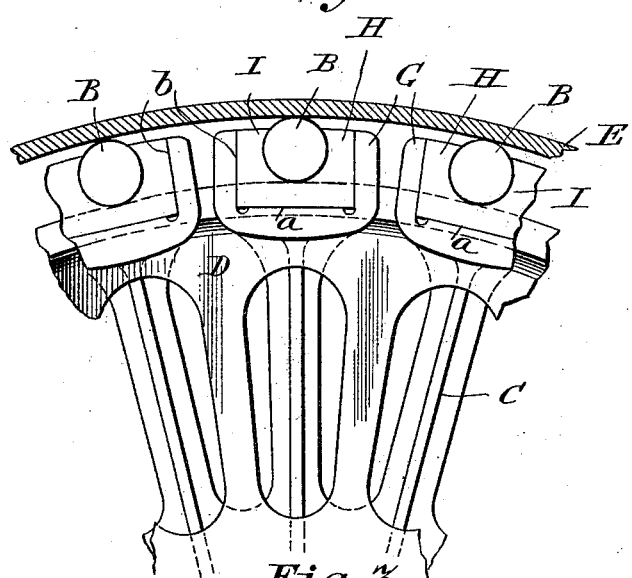
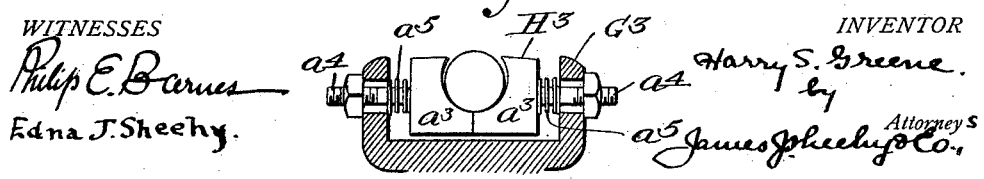
WITNESSES
Philip E. Barnes
Edna J. Sheehy
INVENTOR
Harry S. Greene
by James J. Sheehy & Co., Attorneys

UNITED STATES PATENT OFFICE.

HARRY S. GREENE, OF WOONSOCKET, RHODE ISLAND.

PLANETARY NAPPING-MACHINE DRUM.

1,030,657. Specification of Letters Patent. Patented June 25, 1912.

Application filed February 14, 1912. Serial No. 677,439.

*To all whom it may concern:*

Be it known that I, HARRY S. GREENE, a citizen of the United States, residing at Woonsocket, in the county of Providence and State of Rhode Island, have invented new and useful Improvements in Planetary Napping-Machine Drums, of which the following is a specification.

My present invention has to do with planetary napping machine drums and analogous devices, and is designed more particularly as an improvement upon the subject matter of my contemporary application filed Oct. 14, 1911, Serial Number 654,633. In the drum of my said prior application, the journals of the napping rolls are moved outward and inward under the influence of centrifugal action and gravity in the head or rotary body by which they are carried, and are rotated about their axes incidental to the rotation of the head or rotary body about its axis and preferably in a reverse direction to that of said head or rotary body. Because of this arrangement, the bearings in the head or rotary body soon become worn and out of shape and give rise to rattling of the rolls, with the result that it is soon necessary to provide a new head or rotary body at considerable expense.

The object of the present invention is to provide in the head or rotary body a carrier for the journal of each napping roll; the said carriers being movable rectilinearly away from and toward the center of the head or rotary body and with the journals of the napping rolls so that the outward and inward movement of the journals is attended by no frictional wear of the head or rotary body, and the rotation of the journals about their axes during rotation of the head or rotary body about its axis is attended by frictional wear of the journals and carriers only. In this connection I would also have it understood that in the preferred embodiment of my invention the rectilinearly movable carriers for the journals are made removable, so that when one becomes unduly worn it may be expeditiously and easily taken out of the head or rotary body to give place to a new carrier.

With the foregoing in mind the invention will be fully understood from the following description and claims, when the same are read in connection with the drawings, accompanying and forming part of this specification, in which:

Figure 1 is a view, partly in diametrical section and partly in elevation, of so much of a napping machine drum as is necessary to illustrate one embodiment of my invention. Fig. 2 is a detail section taken in the plane indicated by the line 2—2 of Fig. 1. Fig. 3 is a detail of a modification hereinafter specifically referred to.

Similar letters designate corresponding parts in Figs. 1 and 2, referring to which:

A is the main shaft of the drum of a planetary napping machine to which motion is imparted to rotate the drum.

B B are the journals of the circular series of napping rolls comprised in the drum.

C is a head or rotatable body fixed in suitable manner to the shaft so as to turn therewith.

D is a bearing wheel loose on the shaft A, and disposed within the circular series of journals B, and E is a hoop that surrounds the circular series of journals B. The construction shown in Figs. 1 and 2 is duplicated at the opposite end of the drum, and the journals at the said opposite end of the drum are preferably provided with pulleys (not shown), for the engagement of the ordinary and well known band employed in rotating napping rolls about their axes incidental to rotation of the napping drum about its axis. I would here have it understood, however, that any means may be employed for so rotating the napping rolls about their axes without involving departure from the scope of my present invention as claimed.

The head or rotary body C and the bearing wheel D are preferably, though not necessarily, of spider form, and the hoop E may be supported and retained against undue lateral movement by any appropriate means without affecting my invention. I prefer, however, to center the said hoop E on the shaft A through the medium of a spider or other wheel F, which is loose on the shaft A and is retained by any suitable means against undue movement in the direction of the length of the said shaft.

As will be observed by comparison of Figs. 1 and 2, the head or rotary body C is provided with lateral boxes G, each of which has a bottom wall $a$ and side walls $b$, and is provided in its bottom wall $a$ with a slot $c$, to enable the journals B to contact under some conditions with the perimeter of the wheel D. In each of the said boxes G is arranged a journal carrier H, which is movable rectilinearly away from and toward the center of movement of the drum. Each carrier H is provided with a journal-receiving space I, and is also provided with a slot or opening $d$ in the bottom of said space to permit of contact between the wheel D and the journals B.

In practice, when the drum is rotated about its axis, the centrifugal action will throw the carriers H and the journals B outward, and hence the journals will be maintained away from the carriers H and against the inner side of the hoop E. Because of this, the hoop E will be turned by the contact of the journals around the circular series of journals, and hence friction incidental to the rotation of the journals about their axes, will be reduced to a minimum. At other times, as when the drum is being started or is approaching cessation of movement, or is being turned at a low rate of speed, the carriers H and the journals B will be moved by gravity toward the center of the drum, and then the journals B will bear upon and turn the wheel D, so that at that time the rotation of the journals will give rise to practically no frictional wear.

During the mentioned outward and inward movement of the rectilinearly movable carriers H, the head or rotatable body C will not be subjected to any frictional wear by the journals B which move outward and inward with the carriers H. Moreover, when the carriers H are made removable from the head or body C, as is preferred, any one of the carriers H, when unduly worn, may be taken out of the head or body C and replaced with a new carrier.

It will be gathered from the foregoing that my improvement is calculated to obviate the rattle and objectionable noise caused by the operation of planetary napping machine drums; also, that the desired end is attained in a simple and practical manner, and without unduly complicating the construction of the drum.

The salient feature of my invention is the disposition of the journals B in the carriers H, and it will be noted that the journals fit closely in the carriers which constitute movable retainers for the same. It will also be noted that there are greater bearing surfaces between the carriers H and the boxes G than between the diametrically-opposite portions of the journals and their bearings, and hence there is little liability of frictional wear between said journals and bearings. The journals extend beyond the carriers because of the tops of the latter being planed off or otherwise removed, and this enables the hoop E to coöperate with the journals.

The wheel D is not essential to the successful practice of my present invention, and hence may be omitted without involving departure from the scope of my invention as broadly claimed, it being obvious that when the wheel D is omitted the slots $c$ and the openings $d$ will also be omitted.

While my said improvement is designed more particularly for embodiment in a planetary napping machine drum, I desire it distinctly understood that the said improvement may be put to all of the uses to which it is applicable without involving departure from the scope of my appended claims.

The construction of the carriers H may be varied as deemed expedient, by the manufacturer of my improvement. In other words, the carriers H may be of any appropriate construction, as will be understood by comparison of Figs. 2 and 3; the carriers in the former figure being respectively made in one piece, while the carrier $H^3$, in the latter figure, comprises two sections $a^3$ opposed to each other and having lateral projections $a^4$ disposed in slots in the box $G^3$, and held by springs $a^5$ against each other.

Having described my invention, what I claim and desire to secure by Letters-Patent, is:

1. The combination of a suitably supported shaft, a head fixed on and adapted to turn with the shaft and having boxes and also having openings in the bottoms of said boxes, carriers movable rectilinearly in said boxes and having openings in their bottoms, a circular series of journals disposed one in each carrier, a wheel loosely mounted on the shaft, alongside the head, and extending through the openings in the said boxes and carriers, a wheel loosely mounted on the shaft alongside the first-named wheel, and a hoop carried by the second-named wheel and surrounding and movable about the circular series of journals and adapted to receive the contact of said journals.

2. The combination of a suitably supported shaft, a head fixed on and adapted to turn with the shaft; said head having spaced boxes open at the perimeter of the head and each having side walls and a bottom wall in which is an opening, carriers movable rectilinearly in said boxes and having journal-receiving spaces and openings in the bottoms of said spaces, a circular series of journals arranged one in the space of each carrier, a wheel loosely mounted on the shaft, alongside the head and extending through the openings in the said boxes and carriers for contact with the journals, and a hoop surrounding and movable about the circular series of journals and adapted to receive the contact of said journals.

3. The combination of a suitably supported shaft, a head fixed on and adapted to turn with the shaft and having boxes, carriers movable rectilinearly in said boxes, a circular series of journals disposed one in each carrier and movable with said carrier away from and toward the center of the head, anti-friction bearing means disposed within and adapted to contact with the circular series of journals, and a hoop surrounding the circular series of journals; said hoop being movable about the series of journals and adapted to receive the contact thereof.

4. The combination of a rotatable body having boxes, carriers disposed one in each box and movable therein away from and toward the center of movement of the body, a circular series of journals disposed one in each carrier and movable with said carrier away from and toward the center of movement of the body, and a hoop surrounding the circular series of journals; said hoop being movable about the series of journals and arranged to receive the contact thereof.

5. The combination of a rotatable body having boxes, carriers disposed one in each box and movable therein away from and toward the center of movement of the body, a circular series of journals disposed one in each carrier and movable with said carrier away from and toward the center of movement of the body, and a bearing wheel arranged within the circular series of journals; said wheel being arranged to receive the contact of the journals and to be rotated thereby.

6. The combination of a rotatable body having boxes, carriers disposed one in each box and movable therein away from and toward the center of movement of the body, a circular series of journals, one in each carrier, a bearing wheel arranged within the circular series of journals; said wheel being arranged to receive the contact of the journals and to be rotated thereby, and a hoop surrounding the circular series of journals; said hoop being movable about the series of journals and arranged to receive the contact thereof.

7. The combination of a rotatable body having boxes, carriers disposed one in each box and movable therein away from and toward the center of movement of the body, a circular series of journals disposed one in each carrier and movable with said carrier away from and toward the center of movement of the body, movable means constructed to receive the contact of the journals and lessen the friction on the journals when the same and the carriers are moved outward by centrifugal action, and movable means constructed at other times to receive the contact of the journals and lessen the friction on the journals.

8. The combination of a rotatable body, carriers movable therein away from and toward the center of movement of the body, a circular series of journals disposed one in each carrier and movable therewith away from and toward the center of movement of the body, movable means constructed to receive the contact of the journals and lessen the friction on the journals when the same and the carriers are moved outward by centrifugal action, and movable means constructed at other times to receive the contact of the journals and lessen the friction on the journals.

9. The combination of a rotatable body, carriers movable therein away from and toward the center of movement of the body, a circular series of journals disposed one in each carrier and movable therewith away from and toward the center of movement of the body, and movable means constructed to receive the contact of the journals and lessen the friction on the journals when the same and the carriers are not thrown outward by centrifugal action.

In testimony whereof I have hereunto set my hand in presence of two subscribing witnesses.

HARRY S. GREENE.

Witnesses:
  FRANCES L. COYLE,
  WILLIAM L. GREENE.

---

Copies of this patent may be obtained for five cents each, by addressing the "Commissioner of Patents, Washington, D. C."